United States Patent Office 2,925,652
Patented Feb. 23, 1960

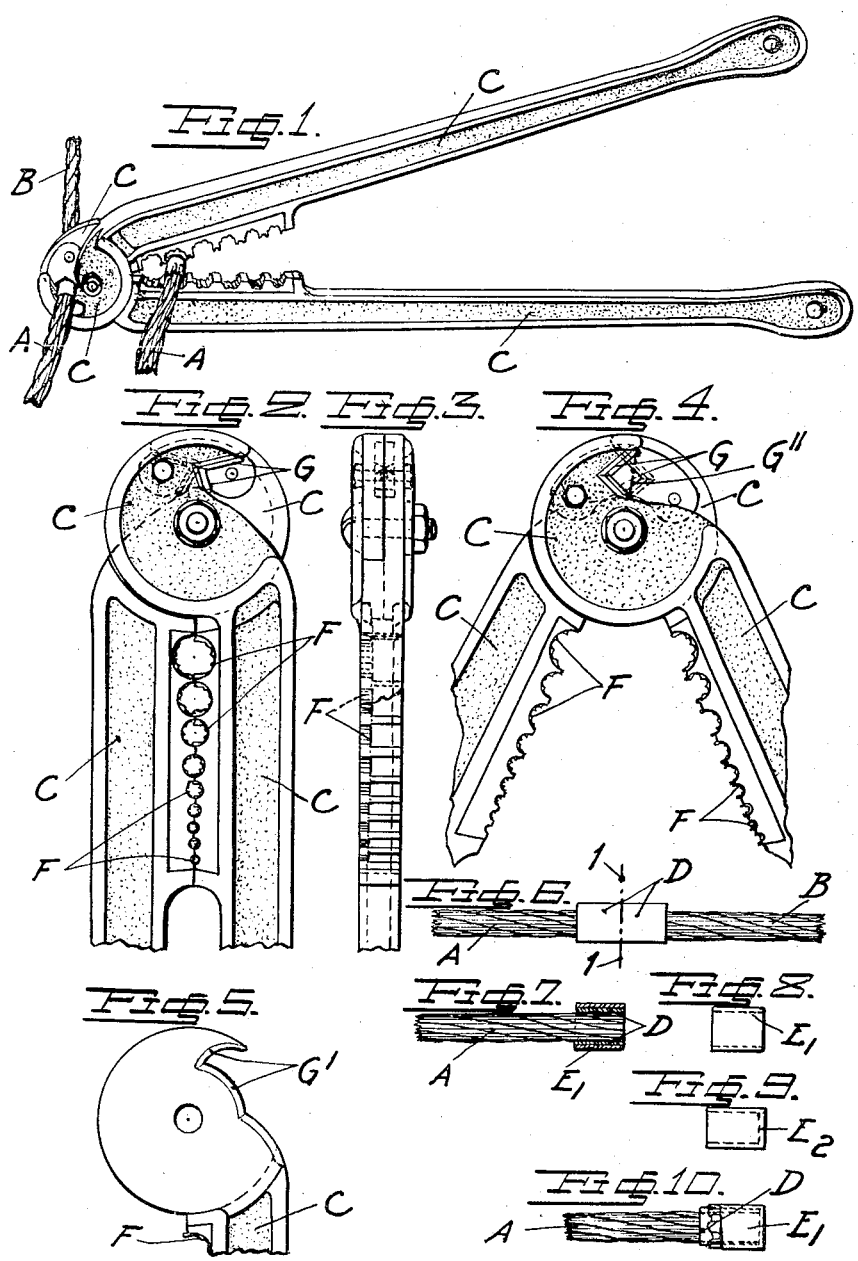

2,925,652
METHOD FOR CUTTING WIRE

Bror Axel Lundquist, Stockholm, Sweden

Application April 22, 1955, Serial No. 503,234

Claims priority, application Sweden April 23, 1954

2 Claims. (Cl. 29—414)

This invention relates to a method for cutting wire as well as to a pair of suitable, shears-shaped tongs or cutting nippers for carrying the method into effect, this method including the provision of a stationary and solid means around the wire ends at the cutting point to hold the wire strands together without spreading after the cutting.

The method according to the invention comprises the steps of winding an adhesive strip such as tape or insulating tape of suitable width around the wire in the place where this is to be cut, thus providing a temporary coating around the wire strands, cutting the wire and the tape coating by means of a pair of shears-like tongs in such a way that a portion of the tape coating remains on each of the cut ends to hold the strands together, fitting a relatively short sleeve of metal or like material on each wire end with its tape coating, said sleeve being either open at both ends or having a bottom, and compressing the sleeve in one of a series of edge recesses in the handle shanks of the tongs in order to provide the sleeve with peripherical folds entering between the wire strands to lock the sleeve on the wire end.

The shears-like tongs used for carrying the method into effect are mainly characterized therein, that, besides being provided with the above-mentioned series of edge recesses along the inner edges of the handle shanks, they are also equipped with cutting edges on their outer shanks, which cutting edges are angularly disposed relative to each other or arc-shaped to provide an approximately square grip around the wire during cutting. Preferably the said cutting edges consist of separate members of high test carbon steel or tool steel, secured in suitable recesses provided in the outer, castings shanks of the tongs, or of knife edges which are arc-shaped from an inner point on each outer shank and are so arranged with convex and concave portions relative one another in an edge recess in each shank within a shank sector, that during cutting the active portions of arc-shaped knife edges of both shanks as well as the opening between them are successively reduced, so that the knife edges will maintain the same cutting grip around the wire throughout the cutting operation.

The accompanying drawing shows an embodiment of a pair of shears-like tongs according to the invention with two cutting edges of different designs, and a wire length to be cut, together with pertaining parts according to the invention.

Fig. 1 shows in perspective a pair of shears-like tongs according to the invention, as viewed from the side, with a piece of prepared wire inserted between the cutting means ready for cutting, and a wire end enclosed by a metal sleeve inserted in one of a number of recesses in the handle shanks for clamping the sleeve around the wire.

Fig. 2 is a side view of the upper portion of the tongs with the handle shanks in closed position, as after a cutting operation, the tongs having cutting edges disposed angularly to one another.

Fig. 3 shows the tongs as viewed from one edge, partly in section.

Fig. 4 is a side view of the upper portion of the tongs with the handle shanks in opened position, as before a cutting operation. As indicated by a chain-dotted line in the figure, the cutting means on one shank may be straight instead of angular.

Fig. 5 is a principal sketch in side view of an upper portion of one tongs shank with arc-shaped cutting means, which portion is theoretically active during wire cutting to provide a square grip around the wire through co-operation with exactly similar cutting means on the upper portion of the other tongs shank.

Fig. 6 shows a wire piece provided with a tape coating before cutting.

Fig. 7 shows a wire part after cutting, provided with a metal sleeve.

Fig. 8 is a sleeve without bottom and

Fig. 9 is a sleeve with bottom.

Fig. 10 shows a wire part ready for use with tape coating and clamped-on sleeve.

Referring now to the figures, A is a wire piece to be cut off the wire length B by means of a pair of shears-like tongs C, and D, $E_1$ and $E_2$ designate permanent members (Figs. 6–8) embracing the ends of the wire parts A and B to keep the wire strands together after cutting. Before being cut, the wire A, B has been provided with a winding of an adhesive tape of suitable width, f. ins. 10–20 mm., in the intended cutting place 1, said tape thus forming a protective, temporary coating around the wire. Then the wire is cut, together with the tape coating D, by means of the shears-like tongs C, a portion of the tape D remaining on each wire end A and B temporarily keeping the wire strand ends together. After this, a rather short sleeve $E_1$ without bottom or $E_2$ with bottom, of metal or the like, is fitted by hand on each wire end A and B with tape coating D. Through being compressed in one out of a series of edge recesses F in the inner edges of the handle shanks of the tongs C and sleeve $E_1$ and $E_2$ respectively is provided with a series of peripherical dents entering the external cavities between the wire strands to lock the sleeve on the wire end A and B. Besides the edge recesses F the tongs C are provided with cutting edges G, and G' respectively, on the inner portions of the outer shanks of the tongs C, said cutting edges being angularly disposed relative one another, or being arc-shaped, in order to provide an approximately uniform square grip around the wire A, B during the cutting procedure. As indicated by a chain-dotted line in Fig. 4, the cutting means on one shank may consist of a straight edge. The said cutting edges G or G', which may form separate members of high test carbon steel or tool steel, can be secured in grooves (indicated by dotted lines in Figs. 1–3) in the outer shanks of the tongs C, the shanks consisting of casting.

To provide a theoretically effective square grip during cutting, the arc-shaped cutting edges G' are designed as shown in Fig. 5, and co-operate as explained in the preamble of this description.

It will be obvious that the parts described may be modified in several ways without abandonment of the inventional idea.

I claim:

1. The method of cutting a wire and providing the cut ends with ferrules, comprising the steps of winding an adhesive tape around the wire at the part to be cut, to hold the wire strands together temporarily, cutting the tape and the wire by bringing thereagainst from opposite direction a pair of angularly disposed shearing edges thus providing a combined squeezing and shearing action so that a portion of the tape encloses each of the cut ends, pushing a ferrule on to each wire end over said tape, and compressing said ferrule on to each wire end over said tape, and compressing said ferrule in one pair of said recesses to provide said ferrule with dents penetrating between the bundles of wire strands.

2. A method of cutting a multiple strand wire cable and forming end fittings on the cut ends comprising the steps of winding a tape onto the cable at the place to be cut, cutting the cable and tape, placing on the cut cable ends and cut tape a sleeve of pliable metal, and compressing said sleeves onto the wire ends to cause pliable metal to conform to the shape of the cable ends and extend into recesses between the wire strands of the cable.

References Cited in the file of this patent

UNITED STATES PATENTS

| | | |
|---|---|---|
| 396,819 | Hubbell | Jan. 29, 1889 |
| 870,951 | Goodholm | Nov. 12, 1907 |
| 933,860 | Stolle | Sept. 14, 1909 |
| 1,690,865 | Kondolf | Nov. 6, 1928 |
| 1,727,760 | Forney | Sept. 10, 1929 |
| 1,812,646 | Burd | June 30, 1931 |
| 1,855,340 | Damon | Apr. 26, 1932 |
| 1,858,418 | Rowley | May 17, 1932 |
| 2,260,884 | Clinton | Oct. 28, 1941 |
| 2,262,802 | Hayden | Nov. 18, 1941 |